US010881095B2

(12) United States Patent
Boyd et al.

(10) Patent No.: US 10,881,095 B2
(45) Date of Patent: Jan. 5, 2021

(54) PRECISION HERBICIDE APPLICATOR FOR HOLE PUNCH EQUIPMENT (71) Applicant: University of Florida Research Foundation, Inc., Gainesville, FL (US)

(72) Inventors: Nathan S. Boyd, Riverview, FL (US); Arnold W. Schumann, Auburndale, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 160 days.

(21) Appl. No.: 16/179,379

(22) Filed: Nov. 2, 2018

(65) Prior Publication Data

US 2019/0133108 A1    May 9, 2019

Related U.S. Application Data (60) Provisional application No. 62/582,696, filed on Nov. 7, 2017.

(51) Int. Cl.
*A01M 7/00* (2006.01)
*A01M 21/04* (2006.01)

(52) U.S. Cl.
CPC .......... *A01M 7/0042* (2013.01); *A01M 7/005* (2013.01); *A01M 7/0089* (2013.01); *A01M 21/043* (2013.01)

(58) Field of Classification Search
CPC .............. A01M 7/0042; A01M 7/0032; A01M 7/0025; A01M 7/00; A01M 7/005; A01M 7/0089; A01M 21/043; A01M 21/04; A01M 21/00
See application file for complete search history.

(56) References Cited

U.S. PATENT DOCUMENTS 9,265,187 B2 *  2/2016  Cavender-Bares ........................ B64C 39/024
2007/0193482 A1 *  8/2007  Spooner ................. A01C 7/044
                                                                111/178

* cited by examiner

Primary Examiner — Christopher J. Novosad
(74) Attorney, Agent, or Firm — Thomas | Horstemeyer, LLP (57) ABSTRACT Various examples are discussed for creating punched holes into a plastic mulch covering a top soil bed and precisely spraying herbicide for a limited time into each of the punched holes and on the top soil located directly below each of the punched holes in a plasticulture vegetable production operation.

20 Claims, 4 Drawing Sheets

PRECISION HERBICIDE APPLICATOR FOR HOLE PUNCH EQUIPMENT

CROSS-REFERENCE TO RELATED APPLICATIONS

This application claims the benefit of and priority to U.S. Provisional Patent Application No. 62/582,696, filed on Nov. 7, 2017, entitled "PRECISION HERBICIDE APPLICATOR FOR HOLE PUNCH EQUIPMENT," the contents of which are incorporated by reference herein in its entirety.

STATEMENT REGARDING FEDERALLY SPONSORED RESEARCH OR DEVELOPMENT

Government Funding: This invention was made funded, in whole or in part, through a subrecipient grant SCBG FDACS 024055 awarded by the United States Department of Agriculture through the Florida Department of Agriculture and Consumer Services. The government has certain rights in this invention.

BACKGROUND OF THE INVENTION

The present disclosure generally relates to plasticulture vegetable production systems, and more particularly relates to application of herbicides to the top soil of beds shaped for plasticulture vegetable production.

Undesirable vegetation such as weeds presents a significant problem to the agricultural industry. For example, when weeds invade crops they can reduce crop yield and decrease crop quality. Agriculturists generally apply agrochemicals such as herbicides to their crops to eradicate or at least manage unwanted vegetation. However, conventional mechanisms usually apply the agrochemicals in a non-selective manner where the chemicals are applied to all of the top soil to be used for plasticulture vegetable production. This broad application of agrochemicals can damage crops, introduce unwanted chemicals into the crops, and increase costs by wasting the agrochemicals. Moreover, if the chemicals are applied too early prior to the transplanting of plants into the soil beds the herbicide ability to knock down weeds may be significantly weaker by the time of transplanting, which unfortunately can result in uncontrolled weed growth in the crops.

SUMMARY OF THE INVENTION

According to one embodiment, in a system comprised of at least one spiked wheel including a plurality of spikes having respective spike tips oriented radially outward from an axis of rotation of the spiked wheel and at least one herbicide sprayer and nozzle for selectively spraying herbicide from the nozzle, a processor/controller, responsive to executing computer instructions, performs operations comprising: determining speed of movement of the at least one spiked wheel over a plastic mulch covered soil bed, the movement of the at least one spiked wheel causing rotation of the plurality of spikes along an axis of rotation of the spiked wheel; determining an occurrence of a tip of one of the rotating spikes piercing through the plastic mulch covering the soil bed to create a punched hole in the plastic mulch; determining an occurrence of when the nozzle of the sprayer is located directly above the punched hole; and in response to determining that the nozzle of the sprayer is located directly above the punched hole, spraying herbicide for a limited time duration from the nozzle into the punched hole and onto the top soil of the bed directly below the punched hole.

BRIEF DESCRIPTION OF THE DRAWINGS

The accompanying figures, in which like reference numerals refer to identical or functionally similar elements throughout the separate views, and which together with the detailed description below are incorporated in and form part of the specification, serve to further illustrate various embodiments and to explain various principles and advantages all in accordance with the present disclosure. The figures are briefly described as follows.

DETAILED DESCRIPTION

As required, various detailed embodiments are disclosed herein; however, it is to be understood that the various disclosed embodiments are merely examples, which can be embodied in various forms. Therefore, specific structural and functional details disclosed herein are not to be interpreted as limiting, but merely as a basis for the claims and as a representative basis for teaching one of ordinary skill in the art to variously employ the present disclosure in virtually any appropriately detailed structure. Further, the terms and phrases used herein are not intended to be limiting; but rather, to provide an understandable description of embodiments of the disclosure.

Plasticulture vegetable production has been widely adopted because the use of drip tape in conjunction with plastic mulches improves water and nutrient use efficiency, increases crop yields and quality, and helps reduce weed competition. Holes are punched in the plastic mulch according to certain pattern and spacing between holes. Transplanted crops, or in some cases seeds, are placed through the punched holes (planting holes) in the top soil directly beneath the punched holes. The mulch prevents the germination or establishment of most broadleaf and grass weeds on the bed except where holes are punched in the mulch to allow the transplant of vegetable crops. Weed emergence in the planting holes can reduce crop yield and quality through direct competition with the crop or by modifying the environment to favor or attract pests and pathogens.

In the southeastern United States, soils are frequently fumigated to control soil-borne pests and pathogens. Many registered fumigants can control or inhibit nutsedge species, for example, but tend to provide poor or inconsistent broadleaf and grass control. Preemergence herbicides are frequently applied following fumigation and bed shaping immediately prior to laying the plastic mulch. This approach is inefficient because broadleaf and grass weeds can only emerge where the holes occur which is a small portion of the bed top but herbicides are broadcast over the entire bed top. According to various embodiments, the present disclosure relates to facilitating the application of herbicides only to the areas of the top soil where the plastic mulch is punctured, i.e., the top soil directly below the punched holes (planting holes). By applying the herbicide only where the holes occur, it significantly reduces the amount of herbicide that is used to control weeds in the soil bed under the plastic mulch.

Figure 1:
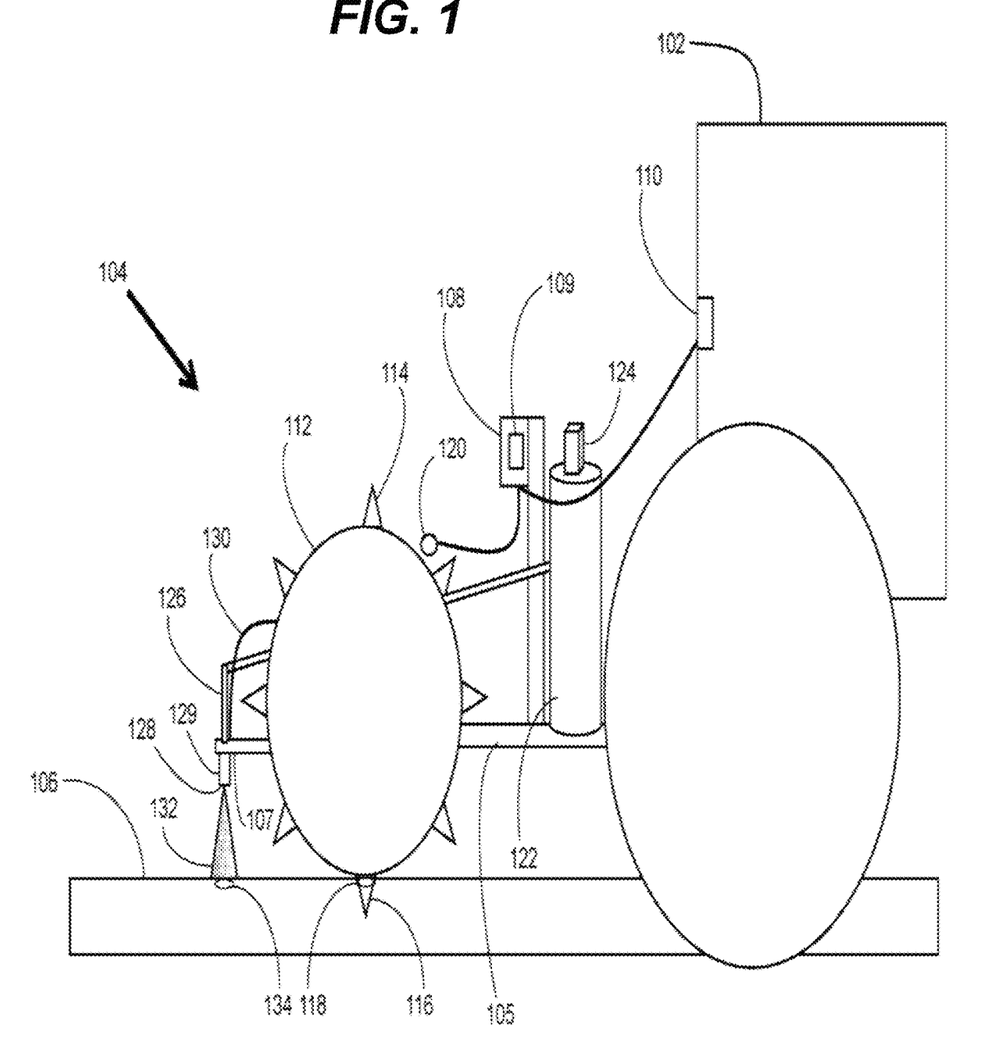
FIG. 1 is a block diagram illustrating a side view of one example of a precision applicator apparatus for preemergence herbicides in plasticulture vegetable production, according to an embodiment of the disclosure.
Figure 2:
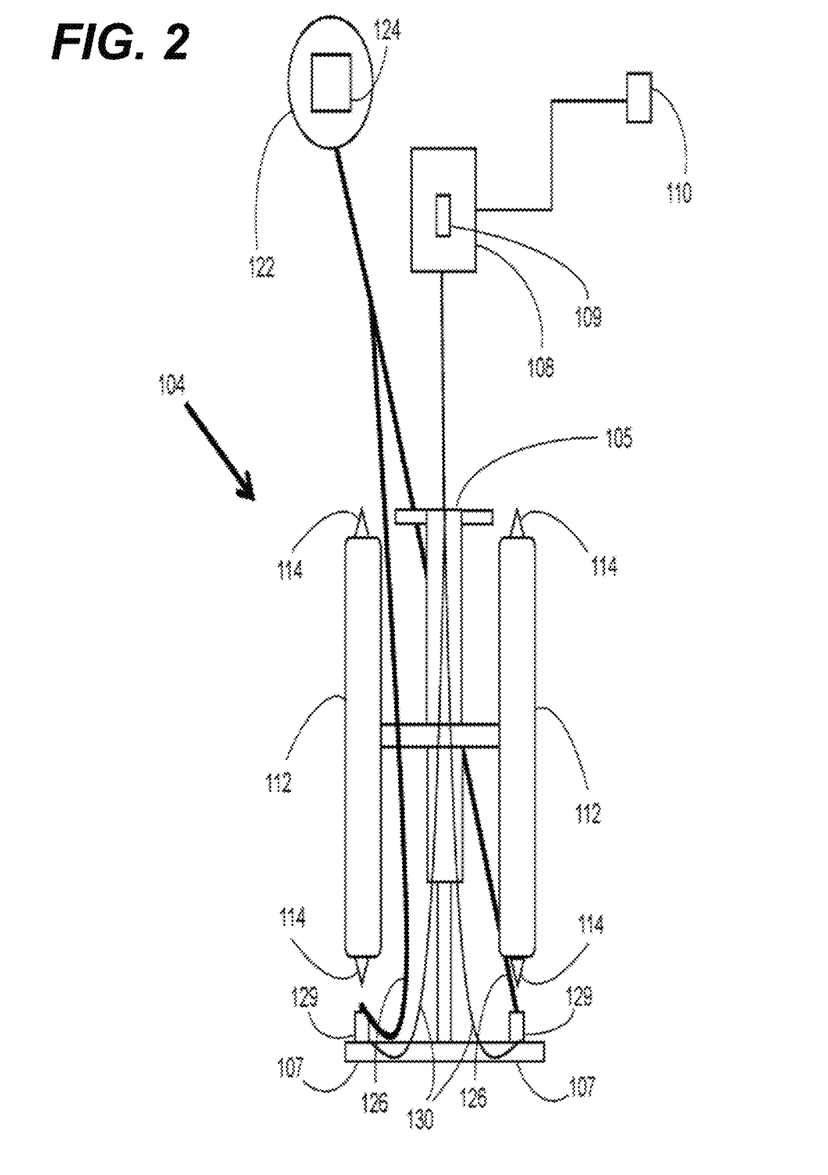
FIG. 2 is a block diagram illustrating a top view of the example of FIG. 1.

With reference to FIGS. 1 and 2, according to one example embodiment, a mobile vehicle 102 (e.g., tractor, all-terrain vehicle, truck, other moving vehicles, etc.) is mechanically coupled to a precision applicator apparatus 104 for preemergence herbicides in plasticulture vegetable production 104. The mobile vehicle 102 and the precision applicator apparatus 104, according to the example, move over a plastic mulch 106 that has been pre-formed on a raised soil bed according to the requirements of a plasticulture vegetable production operation. The precision applicator apparatus 104, in the example of FIGS. 1 and 2, is pulled behind the mobile vehicle 102. However, in various embodiments the precision applicator apparatus 104 may be arranged with the mobile vehicle 102 such that the precision applicator apparatus 104 can be pulled or pushed by the mobile vehicle 102. The precision applicator apparatus 104 also does not have to be pulled or pushed directly behind or directly ahead of the mobile vehicle 102. The precision applicator apparatus 104, for example, could be located side-by-side to the mobile vehicle 102.

The precision applicator apparatus 104, according to the example, is mechanically coupled to the mobile vehicle 102 by a metal chassis 105. At least one spiked wheel 112 is rotationally coupled to the metal chassis 105. In the example, there are two spiked wheels 112 that are individually rotationally coupled to the metal chassis 105. The metal chassis 105 is also mechanically coupled to an extension support frame 107 that supports at least one sprayer 129 above the plastic mulch 106. In the example, there are two sprayers 129 that are individually supported by the extension support frame 107 above the plastic mulch bed 106. Each spiked wheel 112 includes a plurality of spikes 114 that rotate with the rotation of the respective spiked wheel 112.

The pointed end (tip) of each of the spikes 114 is aimed radially outward from a center axis of rotation of the respective spiked wheel 112. As the pointed end 116 of a rotating spike 114 reaches the top surface of the plastic mulch 106, the pointed end 116 punctures (punches) a hole 118 into the plastic mulch 106. The progressive movement and rotation of the spiked wheel 112 causes the rotating spikes 114 to puncture (punch) additional holes into the plastic mulch 106. For example, FIG. 1 shows a previously punched hole 134 that was punched into the plastic mulch 106 by one of the rotating spikes 114. The spacing between the punched holes 118, 134, in the plastic mulch 106 is predetermined by the rotational spacing of (rotational distance between) the rotating spikes 114. The spacing between the punched holes 118, 134, therefore can be customized by design to particular requirements of a plasticulture vegetable production operation.

As best shown in FIG. 1, according to the example, each sprayer 129 has a nozzle 128 that is selectively opened/closed by a controllable solenoid valve (not shown) at the opening of the nozzle 128. The controllable solenoid valve can be controlled by a computer system 108. In the example, the computer system 108 is embodied by at least one processor/controller 108. However, other types of computer systems are anticipated according to various embodiments of the present disclosure. The processor/controller 108 can be turned ON/OFF by an ON/OFF switch 110. This switch 110, according to the example, is located on the mobile vehicle 102 such that it would be readily accessible by the driver of the mobile vehicle 102, even while the mobile vehicle 102 is moving.

The processor/controller 108 includes main memory and non-volatile memory. Various parameters for operating the precision applicator apparatus 104 are stored in a parameter memory in the non-volatile memory. At least some of the parameters stored in the nonvolatile memory are configurable by a user of the precision applicator apparatus 104. The various parameters stored in the parameter memory in the non-volatile memory, may include a set of thresholds stored in the non-volatile memory. Each of the thresholds (also referred to as "threshold values") stores a threshold value that can be monitored and updated by the at least one processor/controller 108. For example, timing threshold values can be used by the processor/controller 108 to calculate the time of occurrence when a rotating spike 114 will puncture the plastic mulch 106. Other timing threshold values can be used by the processor/controller 108 to calculate the precise time of occurrence when a punched hole 134 will be located directly below a sprayer 129 nozzle 128.

The at least one processor/controller 108 is communicatively coupled with a user interface which includes a user output interface and a user input interface. The user interface provides the user input interface for receiving user input communication from a user of the precision applicator apparatus 104. The user interface provides the user output interface for providing communication to the user of the precision applicator apparatus 104.

The user output interface may include one or more display devices to display information to a user. A display device (not shown) can include a monochrome or color Liquid Crystal Display (LCD), Organic Light Emitting Diode (OLED), or other suitable display technology for conveying image information (e.g., text, graphics, icons, etc.) to a user of the computer system 108. A display device, according to certain embodiments, comprises a graphical user interface (GUI). A display device can include, according to certain embodiments, touch screen technology, e.g., a touchscreen display, which also serves as a user input interface for detecting user input (e.g., touch of a user's finger or of a stylus). One or more speakers in the user output interface can provide audible information to the user, and one or more indicators can provide indication of certain conditions of the computer system 108 to the user. The indicators can be visible, audible, or tactile, thereby providing necessary indication information to the user of the computer system 108.

The user input interface may include one or more keyboards, keypads, mouse input device, track pad, and other similar user input devices. A microphone is included in the user input interface, according to various embodiments, as an audio input device that can receive audible signals from a user. The audible signals can be digitized and processed by audio processing circuits and coupled to the processor/controller 108 for voice recognition applications such as for the computer system 108 to receive data and commands as user input from a user of the precision applicator apparatus 104.

One or more input/output interface modules are communicatively coupled with the processor/controller 108. In this way, the computer system 108 is able to communicate with other information processing systems and devices. For example, the processor/controller 108 is communicatively coupled with interface module(s) that communicatively couple the processor/controller 108 with external networks and with a media reader/writer. The external networks can include any one or a combination of wired, wireless, local area, and wide area networks.

The media reader/writer can interoperate with the processor/controller 108 to read and write machine (computer) readable media that may be communicatively coupled with the media reader/writer. Computer readable media, which in the present example comprise a form of non-transitory computer readable storage medium, may be coupled with the media reader/writer to provide information via the interface module(s) to-from the processor/controller 108. For example, data, configuration parameters, and instructions for the processor/controller 108 may be provided via the computer readable media to the computer system 108.

The processor/controller 108 in this example also includes a digital global positioning system (DGPS) receiver module 109 that provides accurate geographic movement data (e.g., speed and/or velocity) to the processor/controller 108. GPS geographic coordinate data is continuously wirelessly received by the DGPS receiver module 109. The DGPS module 109, with the received GPS geographic coordinate data, continuously provides accurate geographic movement data (e.g., speed and/or velocity of the precision applicator apparatus 104) to the processor/controller 108.

The processor/controller 108 is electrically coupled to one or more photoelectric sensors 120 arranged relative to the at least one spiked wheel 112 to detect the presence of a rotating spike 114 of the respective spiked wheel 112 at the photoelectric sensors 120. The time between spike detection and when the rotating spike 114 will puncture the plastic mulch 106 is calculated by the processor/controller 108 using algorithms that incorporate the speed of travel of the precision applicator apparatus 104, the rotational distance between the rotating spikes 114 and the size of the spiked wheel 112.

The timing of when a punched hole 134 is located directly below the nozzle 128 of a sprayer 129 is also calculated by the processor/controller 108. That is, the processor/controller 108 is configured to use the accurate geographic movement data, the rotating spike presence data, and other data available to the processor/controller 108, to compute a timing delay between the occurrence of a spike 114 puncturing a hole 118 in the plastic mulch 106 and the occurrence of a punched hole 134 being located directly below the nozzle 128 of the sprayer 129.

The processor/controller 108 can be electrically coupled (e.g., by electrical wire 130) with the solenoid valve of each of the sprayers 129. In some embodiments, the processor/controller 108 can be in data communication with the solenoid valve via a wireless connection. At the determination of occurrence of a punched hole 134 being located directly below the nozzle 128 of the sprayer 129, the processor/controller 108 actuates the solenoid valve to open and then close at a determined timing such that a spray 132 of herbicide according to a spray pattern is precisely applied to the punched hole 134 and the top soil directly below the punched hole 134. The timing of the opening and closing of the valve can be adjusted to increase or decrease buffer size of the herbicide spray pattern applied to the punched holes 118,134.

According to the present example, the herbicide is stored in a storage tank 122 mounted on the metal chassis 105. The herbicide content of the tank 122 is pressurized by a pump 124 that continuously monitors (with a sensor not shown in the figures) pressure of the content of the tank 122 and maintains the content pressurized to within a range of pressure such that the herbicide content will be consistently and reliably delivered via tubing 126 to each of the sprayers 129.

Figure 4:
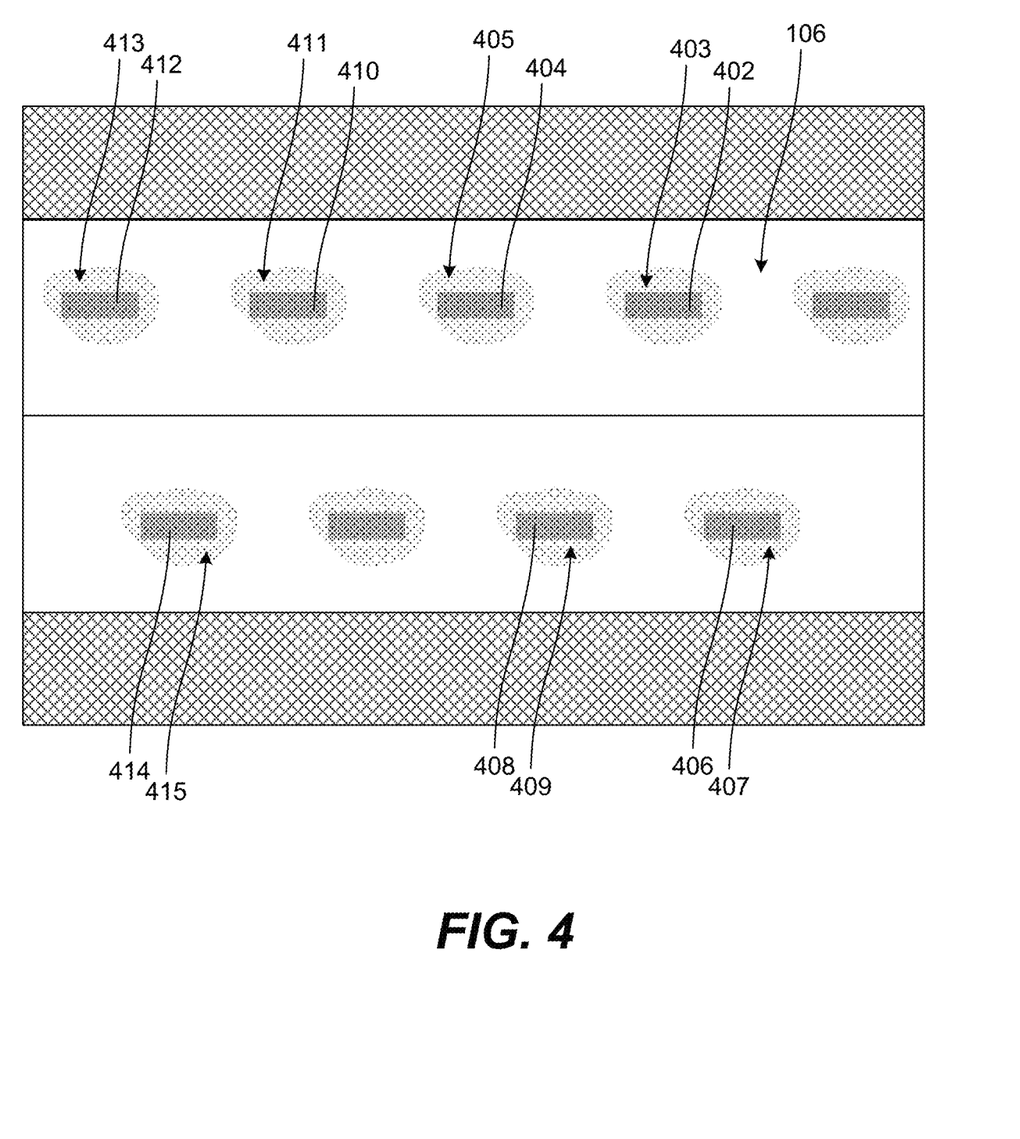
FIG. 4 is a top view of an example plastic mulch arrangement including a collection of punched holes and an associated collection of precisely applied herbicide application patterns, each herbicide application pattern substantially coinciding with a respective punched hole on the plastic mulch.

FIG. 4 illustrates an example pattern of punched holes 402, 404, 406, 408, 410, 412, 414, and a respective pattern of herbicide sprays 403, 405, 407, 409, 411, 413, 415, that is precisely applied coincident over the punched holes. In this way, the herbicide is precisely applied through each punched hole to the top soil of the plastic mulch bed that is located directly below the punched hole.

Figure 3:
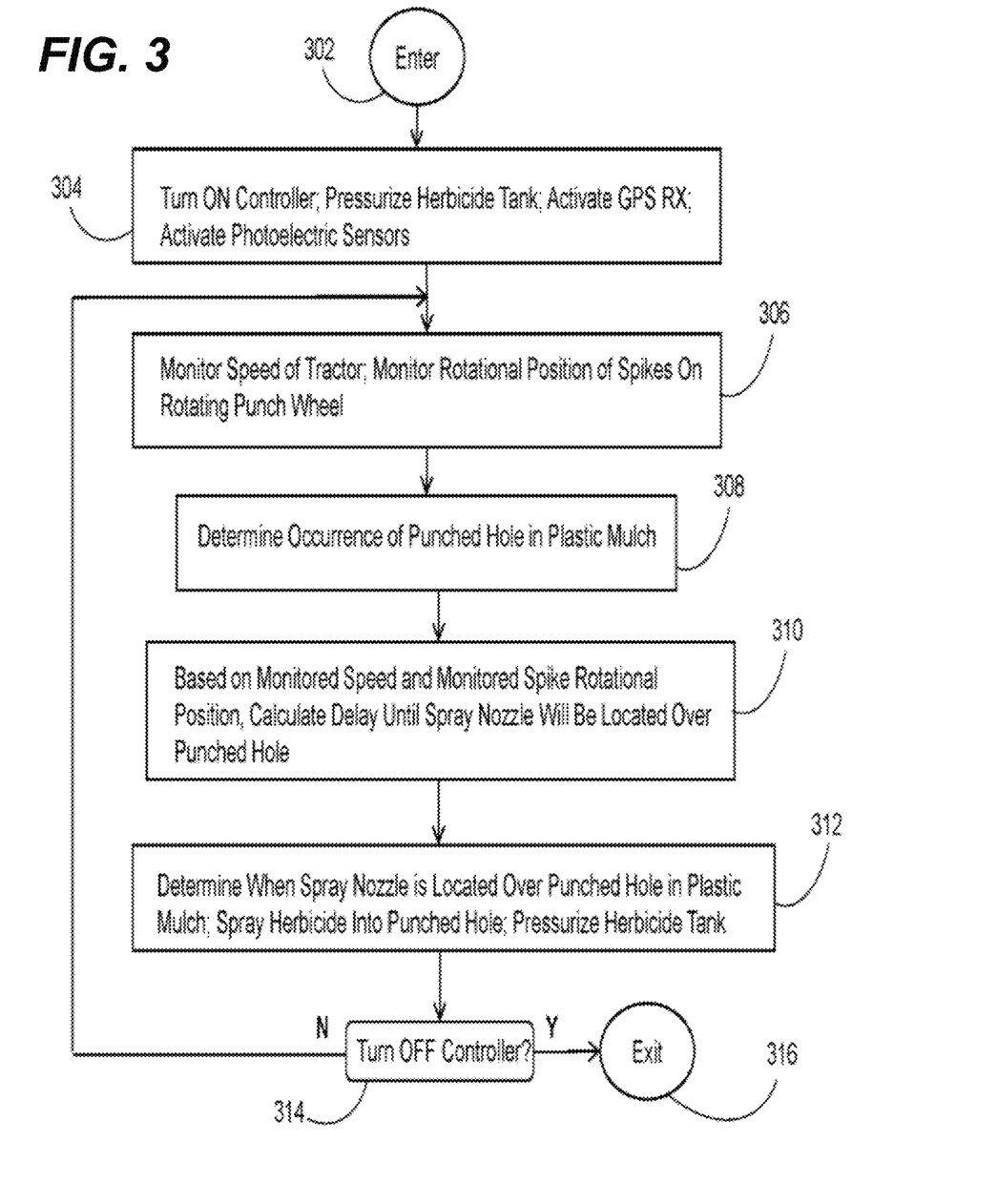
FIG. 3 is an operational flow diagram illustrating example operations of the precision applicator of FIGS. 1 and 2, according to various embodiments of the present disclosure.

FIG. 3 illustrates an example operational sequence to precisely apply the herbicide sprays onto the punched holes. The process is entered, at step 302, and then proceeds, at step 304, to turn on the controller 108, pressurize the herbicide tank 122, and activate the GPS receiver 109 and activate the photoelectric sensors. The processor/controller 108 then, at step 306, monitors the speed of the mobile vehicle 102 and the precision applicator apparatus 104.

The processor/controller 108 also monitors the rotational position of the spikes on the rotating spiked wheel 112. The processor/controller 108 then, at step 308, determines the occurrence of a punched hole 134 in the plastic mulch. The processor/controller 108 also calculates, at step 310, a delay time until a sprayer 129 and nozzle 128 will be located directly above a punched hole 134.

When the processor/controller 108 determines that a sprayer 129 and nozzle 128 are located directly above a punched hole 134, at step 312, the processor/controller 108 actuates a solenoid valve in the sprayer 129 to open and then close the solenoid valve for a limited time. Herbicide is precisely sprayed into the punched hole 134 and thereby on the top soil of the bed located directly below the punched hole 134.

The processor/controller 108, at step 314, determines whether to stop operation of the precision applicator apparatus 104 and to turn OFF the processor/controller 108. For example, the processor/controller 108 can detect an input directing the processor/controller 108 to turn OFF from the ON/OFF switch 110. While the processor/controller 108 remains ON and the precision applicator apparatus 104 continues operating, the operational sequence repeats at steps 306, 308, 310, 312, 314. Alternatively, when the processor/controller 108 determines to turn itself OFF and to stop the operation of the precision applicator apparatus 104, the operational sequence is exited, at step 316.

As will be appreciated by one of ordinary skill in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects, that may each generally be referred to herein as a "circuit," "module" or "system." Furthermore, aspects of the present disclosure may take the form of a computer program product embodied in one or more computer readable storage medium(s) having computer readable program code embodied thereon.

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Aspects of the present disclosure are described with reference to flowchart illustrations and/or block diagrams of methods, apparatus (systems) and computer program products according to various embodiments of the disclosure. It will be understood that one or more blocks of the flowchart illustrations and/or block diagrams, and combinations of blocks in the flowchart illustrations and/or block diagrams, can be implemented by computer program instructions. These computer program instructions may be provided to one or more processors, to a special purpose computer, or to other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner. Instructions stored in a computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Although the present specification may describe components and functions implemented in the embodiments with reference to particular standards and protocols, the disclosure is not limited to such standards and protocols. Each of the standards represents an example of the state of the art. Such standards are from time-to-time superseded by faster or more efficient equivalents having essentially the same functions.

The illustrations of examples described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. The examples herein are intended to cover any and all adaptations or variations of various embodiments. Combinations of the above embodiments, and other embodiments not specifically described herein, are contemplated herein.

The Abstract is provided with the understanding that it is not intended be used to interpret or limit the scope or meaning of the claims. In addition, in the foregoing Detailed Description, various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. Plural and singular terms are the same unless expressly stated otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "another", as used herein, is defined as at least a second or more. The terms "including" and "having," as used herein, are defined as comprising (i.e., open language). The term "coupled," as used herein, is defined as "connected," although not necessarily directly, and not necessarily mechanically. "Communicatively coupled" refers to coupling of components such that these components are able to communicate with one another through, for example, wired, wireless or other communications media. The term "communicatively coupled" or "communicatively coupling" includes, but is not limited to, communicating electronic control signals by which one element may direct or control another. The term "configured to" describes hardware, software or a combination of hardware and software that is adapted to, set up, arranged, built, composed, constructed, designed or that has any combination of these characteristics to carry out a given function. The term "adapted to" describes hardware, software or a combination of hardware and software that is capable of, able to accommodate, to make, or that is suitable to carry out a given function.

The terms "controller", "computer", "processor", "server", "client", "computer system", "computing system", "personal computing system", "processing system", or "information processing system", describe examples of a suitably configured processing system adapted to implement one or more embodiments herein. Any suitably configured processing system is similarly able to be used by embodiments herein, for example and not for limitation, a personal computer, a laptop computer, a tablet computer, a smart phone, a personal digital assistant, a workstation, or the like. A processing system may include one or more processing systems or processors. A processing system can be realized in a centralized fashion in one processing system or in a distributed fashion where different elements are spread across several interconnected processing systems.

The corresponding structures, materials, acts, and equivalents of all means or step plus function elements in the claims below are intended to include any structure, material, or act for performing the function in combination with other claimed elements as specifically claimed. The description herein has been presented for purposes of illustration and description, but is not intended to be exhaustive or limited to the examples in the form disclosed. Many modifications and variations will be apparent to those of ordinary skill in the art without departing from the scope of the disclosure presented or claimed. The disclosed embodiments were chosen and described in order to explain the principles of the embodiments and the practical application, and to enable others of ordinary skill in the art to understand the various embodiments with various modifications as are suited to the particular use contemplated. It is intended that the appended claims below cover any and all such applications, modifications, and variations within the scope of the embodiments.

What is claimed is:

1. An apparatus for selectively applying herbicide to a plastic mulch covered soil bed, the apparatus comprising:
   a mobile vehicle; and
   an applicator system mechanically coupled to the mobile vehicle, the applicator system comprising:
   a spiked wheel including a plurality of spikes having respective spike tips oriented radially outward from an axis of rotation of the spiked wheel, the plurality of spikes being configured to punch one or more holes in plastic mulch of the plastic mulch covered soil bed during a rotation of the spiked wheel; and
   a sprayer comprising a nozzle, the sprayer being configured to selectively spray the herbicide from the nozzle into the one or more holes.

2. The apparatus of claim 1, wherein the applicator further comprises:
   a computer system comprising a processor and a memory; and
   at least one application executable by the processor, wherein, when executed, the at least one application causes the computer system to at least:
   determine an occurrence of when the nozzle of the sprayer is located directly above a punched hole of the one or more holes; and
   in response to determining that the nozzle of the sprayer is located directly above the punched hole, cause the herbicide to be sprayed from the nozzle into the punched hole and onto top soil of the plastic mulch covered soil bed directly below the punched hole.

3. The apparatus of claim 2, wherein, when executed, the at least one application further causes the computer system to at least:
   determine a speed of a movement of the spiked wheel over the plastic mulch covered soil bed, the movement of the spiked wheel causing rotation of the plurality of spikes along the axis of rotation of the spiked wheel; and
   determine an occurrence of a tip of one of the plurality of spikes being rotated piercing through the plastic mulch covering the plastic mulch covered soil bed to create the punched hole in the plastic mulch.

4. The apparatus of claim 3, wherein, when executed, the at least one application further causes the computer system to at least:
   calculate a timing delay between the occurrence of the tip of the one of the plurality of spikes of the spiked wheel piercing the plastic mulch to create the punched hole and the occurrence of when the nozzle of the sprayer is located directly above the punched hole.

5. The apparatus of claim 2, wherein the herbicide is sprayed into the punched hole for a limited time duration.

6. The apparatus of claim 2, wherein the applicator system further comprises a switch electrically coupled to the computer system, the switch being configured to turn on and turn off the computer system.

7. The apparatus of claim 2, wherein the computer system comprises a global positioning system (GPS) receiver, and wherein, when executed, the at least one application further causes the computer system to determine a speed of travel of the applicator system based at least in part on data received from the GPS receiver.

8. The apparatus of claim 1, wherein the mobile vehicle comprises a tractor.

9. The apparatus of claim 1, wherein the applicator system is mechanically coupled to a front portion or a rear portion of the mobile vehicle.

10. The apparatus of claim 1, wherein the mobile vehicle pulls or pushes the applicator system.

11. A method for selectively applying herbicide, the method comprising:
    determining, via at least one computing device, a speed of a movement of a spiked wheel of the applicator apparatus over a plastic mulch covered soil bed, the movement of the spiked wheel causing a rotation of a plurality of spikes of the spiked wheel along an axis of rotation of the spiked wheel;
    determining, via the at least one computing device, an occurrence of a tip of one of the plurality of spikes being rotated piercing through plastic mulch covering the plastic mulch covered soil bed to create a punched hole in the plastic mulch;
    determining, via the at least one computing device, an occurrence of when a nozzle of a sprayer of the applicator apparatus is located directly above the punched hole; and
    in response to determining that the nozzle of the sprayer is located directly above the punched hole, spraying herbicide for a limited time duration from the nozzle into the punched hole and onto top soil of the plastic mulch covered soil bed directly below the punched hole.

12. The method of claim 11, further comprising monitoring global positioning system (GPS) data received from a DGPS receiver of the applicator apparatus, wherein determining the speed of the movement of the spiked wheel over the plastic mulch covered soil bed is based at least in part on the GPS data.

13. The method of claim 11, further comprising receiving, via the at least one computing device, sensor data from one or more photoelectric sensors coupled to the applicator apparatus, wherein determining the occurrence of the tip of the one of the plurality of spikes being rotated piercing through the plastic mulch is based at least in part on an analysis of the sensor data received from the one or more photoelectric sensors.

14. The method of claim 11, further comprising calculating, via the at least one computing device, a timing delay between the occurrence of the tip of the one of the plurality of spikes being rotated piercing through the plastic mulch and the occurrence of when the nozzle of the sprayer of the applicator apparatus is located directly above the punched hole.

15. The method of claim 14, wherein determining the occurrence of when the nozzle of the sprayer is located directly above the punched hole is based at least in part on the timing delay.

16. The method of claim 11, wherein the tip of one of the plurality of spikes comprises a first tip of a first spike of the plurality of spikes, and further comprising:

causing a progressive movement of spiked wheel over the plastic mulch covered soil bed, the progressive movement of the spiked wheel causing the rotation of the plurality of spikes such that a second tip of a second rotating spike of the plurality of spikes pierces through the plastic mulch covering the plastic mulch covered soil bed to create a second punched hole in the plastic mulch;

determining an occurrence of the second tip of the second rotating spike piercing through the plastic mulch covering the plastic mulch covered soil bed to create the second punched hole in the plastic mulch;

determining an occurrence of when the nozzle of the sprayer is located directly above the second punched hole; and in response to determining that the nozzle of the sprayer is located directly above the second punched hole, spraying the herbicide for the limited time duration from the nozzle into the second punched hole and onto top soil of the plastic mulch covered soil bed directly below the second punched hole.

17. The method of claim 11, further comprising mechanically coupling the applicator apparatus to a moving vehicle, and the movement of the spiked wheel being driven by the moving vehicle.

18. The method of claim 17, wherein the moving vehicle comprises a tractor.

19. The method of claim 17, wherein the moving vehicle pulls or pushes the applicator apparatus.

20. The method of claim 11, wherein spraying the herbicide for the limited time duration comprises:

activating a solenoid valve of the sprayer to open; and
causing the solenoid valve to close following the limited time duration.

* * * * *